United States Patent
Chaudeurge

(10) Patent No.: US 10,683,025 B2
(45) Date of Patent: Jun. 16, 2020

(54) PUSHCHAIR ACCESSORY, AND A TRANSPORT ASSEMBLY COMPRISING A PUSHCHAIR AND SUCH AN ACCESSORY

(71) Applicant: BABYZEN, Aix-en-Provence (FR)

(72) Inventor: Jean-Michel Chaudeurge, Tourves (FR)

(73) Assignee: BABYZEN, Aix-en-Provence (FR)

(*) Notice: Subject to any disclaimer, the term of this patent is extended or adjusted under 35 U.S.C. 154(b) by 0 days.

(21) Appl. No.: 16/332,837

(22) PCT Filed: Jun. 19, 2017

(86) PCT No.: PCT/EP2017/064956
§ 371 (c)(1),
(2) Date: Mar. 13, 2019

(87) PCT Pub. No.: WO2018/050303
PCT Pub. Date: Mar. 22, 2018

(65) Prior Publication Data
US 2019/0367068 A1 Dec. 5, 2019

(30) Foreign Application Priority Data
Sep. 14, 2016 (FR) ...................................... 16 58570

(51) Int. Cl.
*B62D 5/08* (2006.01)
*B62B 5/08* (2006.01)
(Continued)

(52) U.S. Cl.
CPC ................ *B62B 5/08* (2013.01); *B62B 7/145* (2013.01); *B62B 7/008* (2013.01); *B62B 9/28* (2013.01);
(Continued)

(58) Field of Classification Search
CPC ........ B62B 5/08–087; B62B 7/14–147; B62B 9/28; B62K 27/003
See application file for complete search history.

(56) References Cited

U.S. PATENT DOCUMENTS 2,216,584 A * 10/1940 Boden ...................... B60D 1/56
280/460.1
3,387,859 A * 6/1968 McClellan ........... B62D 63/067
280/204
(Continued)

FOREIGN PATENT DOCUMENTS

DE 202 143 848 U1 11/2002
DE 10 2010 016921 A1 11/2011
(Continued)

OTHER PUBLICATIONS

International Search Report, dated Sep. 29, 2017, from corresponding PCT/EP2017/064956 application.
(Continued)

Primary Examiner — Erez Gurari
(74) Attorney, Agent, or Firm — Young & Thompson

(57) ABSTRACT

A platform for a pushchair includes a frame with at least one wheel, and a device for reversibly connecting to the frame of a pushchair supported by the frame. The device can be attached between left and right uprights of the pushchair, belonging to left and right rear portions of the pushchair frame, parallel to and facing each other, with respective and second female housings. The device includes: first and second male elements moving relative to the frame between a connection position and a disconnection position; and a mechanism for activating the first and second male elements, this mechanism being suitable for: jointly moving, through the action of only one hand of a user, the first and second male elements from their connection position to their
(Continued)

disconnection position; and automatically returning the first and second male elements from their disconnection position to their connection position.

15 Claims, 9 Drawing Sheets

(51) Int. Cl.
  *B62B 7/14*  (2006.01)
  *B62B 7/00*  (2006.01)
  *B62B 9/28*  (2006.01)
  *B62K 27/00*  (2006.01)

(52) U.S. Cl.
  CPC ......... *B62B 2202/26* (2013.01); *B62K 27/003* (2013.01)

(56) References Cited

U.S. PATENT DOCUMENTS

| | | | | |
|---|---|---|---|---|
| 4,610,454 | A * | 9/1986 | Gill | B62B 3/18 182/15 |
| 5,064,209 | A * | 11/1991 | Kurschat | B62K 5/025 280/204 |
| 5,927,730 | A * | 7/1999 | Sattler | B62B 5/002 280/47.131 |
| 6,827,356 | B2 * | 12/2004 | Zhuang | B62B 9/28 280/304.1 |
| 7,226,059 | B1 * | 6/2007 | Samuels | B62B 3/027 280/33.991 |
| 8,029,007 | B2 * | 10/2011 | Jones | B62D 63/00 280/204 |
| 8,128,103 | B1 * | 3/2012 | Schutzendorf | B62B 7/008 280/33.993 |
| 2002/0093179 | A1 * | 7/2002 | McKelvey | B62B 3/144 280/651 |
| 2004/0164510 | A1 | 8/2004 | Zhuang | |
| 2005/0253348 | A1 * | 11/2005 | Gwisdalla | B62B 9/00 280/30 |
| 2007/0090619 | A1 * | 4/2007 | Lundh | B62B 9/12 280/63 |
| 2008/0224432 | A1 * | 9/2008 | Lundh | B62B 9/28 280/47.38 |
| 2010/0109270 | A1 * | 5/2010 | Hei | B62B 9/28 280/47.35 |
| 2011/0278823 | A1 * | 11/2011 | Lai | B62B 5/087 280/504 |
| 2012/0217720 | A1 * | 8/2012 | Lai | B62B 9/28 280/204 |
| 2015/0266494 | A1 * | 9/2015 | Weber | B62B 9/28 280/650 |
| 2016/0001805 | A1 * | 1/2016 | Pacella | B62B 7/145 280/47.38 |
| 2016/0257331 | A1 * | 9/2016 | Nuske | B62B 9/12 |
| 2016/0339940 | A1 * | 11/2016 | Lee | B62B 9/102 |
| 2018/0273074 | A1 * | 9/2018 | Tamez | A63C 17/0033 |
| 2019/0161105 | A1 * | 5/2019 | Baron | B62B 9/28 |
| 2020/0010107 | A1 * | 1/2020 | Lin | B62B 9/12 |

FOREIGN PATENT DOCUMENTS

| | | |
|---|---|---|
| EP | 2 495 152 A1 | 9/2012 |
| GB | 2 496 756 A | 5/2013 |
| WO | 2005/039954 A1 | 5/2005 |
| WO | 2007/033562 A1 | 3/2007 |

OTHER PUBLICATIONS

FR Search Report, dated May 9, 2017, from corresponding FR 1658570 application.

* cited by examiner

PUSHCHAIR ACCESSORY, AND A TRANSPORT ASSEMBLY COMPRISING A PUSHCHAIR AND SUCH AN ACCESSORY

The present invention relates to a pushchair accessory, as well as a transport assembly comprising a pushchair and such an accessory.

The invention more particularly relates to rolling pushchair accessories, such as pushchair boards, which are sometimes commercially referred to as "boards" or "kiddy boards". These pushchair boards comprise a chassis forming a platform, which is provided with wheels and which is provided to be connected to the rear part of the frame of a pushchair. Once connected, the board rolls on the ground, while being driven by the pushchair, typically pushed by an adult. The transport assembly, formed by the pushchair and the board connected to the latter, makes it possible to transport both the first child, installed in the pushchair, and a second child, generally older than the first child, standing up on the platform of the chassis of the board. Such an assembly resolves the issue of having to travel with two children who are close in age, the older knowing how to walk while the younger does not walk as well, or even does not yet know how to walk: while the younger child is conveyed in the pushchair pushed by an adult, the older child quickly demonstrates the desire to be conveyed as well, which is made possible by having him climb onto the board, the older child thus being placed between the adult, who is pushing the transport assembly, and the younger child carried in the pushchair.

In practice, the pushchairs do not incorporate such boards permanently. On the contrary, the boards are provided as separate accessories from the pushchair, which the user must attach to the pushchair when he wishes. The connection of the pushchair is typically reversible, to allow the user to release the board when it is no longer useful. To that end, the current solution is to use so-called universal connection devices, which attach to the rear part of the frame of the pushchairs and to which the chassis of the board is hooked. These connection devices are designed to adapt to various shapes of pushchair frames and generally include a jaw for surrounding and engaging a tubular part of said frame, generally by gripping, pinching, blocking, jamming, strapping, etc. A same board may include two connection devices, which attach to respective left and right regions of the frame of the pushchair. Examples are given in WO 2005/039954, DE 10 2010 016 921, DE 202 13,848 and US 2004/0164510. In all cases, these connection devices are simultaneously tedious to implement, requiring the use of tools and/or requiring the manipulation of several parts, are not always safe due to their complex implementation, prove particularly not esthetically pleasing, forming bulging zones on the back of the frame of the pushchair, may prevent folding of the pushchair as long as they are not completely removed, and often lead to damaging the pushchair frame.

In turn, U.S. Pat. No. 3,387,859, which could be considered the closest state of the art to the invention, discloses a trailer for a motorcycle. This trailer comprises a chassis, which is provided with a bearing wheel rolling on the ground and which includes, on each of its lateral sides, a bar extending horizontally when the trailer is connected to the motorcycle. The two bars of the trailer are spaced apart and opposite one another. Each of these bars includes a front part ending with a free end that is equipped with a coupling system including a slide actuated by a compression spring: when there is no stress, the compression spring of each coupling system keeps the corresponding slide in a deployed position in which a pin, which forms the end of said slide turned toward the slide of the other coupling system, protrudes toward the latter from the face of the corresponding bar, turned toward the other bar. To connect the trailer to a rear frame of the motorcycle, the respective front parts of the bars of the chassis are to be positioned on either side of the rear wheel of the motorcycle such that the rear frame of the motorcycle is found between the coupling system of one of the aforementioned bars and the coupling system of the other bar: the pin of each coupling system can then cooperate with a dedicated element of the rear frame, more specifically cooperate with the face of said element turned to the outside, i.e., turned away from the rear wheel of the motorcycle. Of course, in practice, two operators are needed to attach and connect the trailer to the rear frame of the motorcycle, one of said two operators having to hold one of the two aforementioned bars of the frame and actuate the corresponding coupling system while the other operator must hold the other bar and actuate the coupling system of the latter. Likewise, two operators are needed to disconnect and release the trailer with respect to the rear frame of the motorcycle. Furthermore, the coupling systems form, on either side of the rear frame of the motorcycle, protruding protuberances, which are both dangerous and unsightly.

The aim of the present invention is to propose a pushchair accessory that can be connected solidly, effectively, esthetically and very easily.

To that end, the invention relates to a pushchair accessory, as defined in claim 1.

The invention also relates to a transport assembly, as defined in claim 7.

Thus, one of the ideas at the base of the invention is to be able to connect and disconnect the accessory according to the invention instantaneously, i.e., without using tools or adding or removing parts separate from those already integrated into the connection device of the accessory, said connection device being able to be actuated by just one of the user's hands. To that end, the connection device includes two movable male elements, such as pins or the like, that are connected in movement by an actuating mechanism, integrated into the connection device and designed to be urged through the action of only one hand: when it is urged, the mechanism brings the male elements into a disconnection position where they allow the relative movement between the accessory and the pushchair frame, in particular to release the accessory with respect to the pushchair, whereas when there is no urging, the mechanism automatically returns the male elements to a connection position where they are designed to be housed in complementary female locations of the frame of the pushchair, provided in respective left and right uprights of respective left and right rear parts of said frame. These female locations are hollowed in respective faces of the left and right uprights of the pushchair, which are turned toward one another: the connection device is designed to be placed between said faces of the uprights so as to be able to be attached between the uprights to connect the accessory to the frame of the pushchair and to be able to be removed from between the uprights to free the accessory with respect to the pushchair. The connection device is therefore particularly easy to manipulate, having noted that during the placement and removal of the accessory with respect to the pushchair, the user can advantageously hold the accessory in only his hand with which he urges the mechanism of the connection device. To transition the male elements from their disconnection position to their connection position so that they are inserted into the female housings in order to connect the accessory when the connection device is attached between the uprights of the frame of the pushchair, the user releases the manual urging, which he was exerting until then to keep the male elements in the disconnection position, and the mechanism acts automatically on the male elements to engage them as much as possible in the female housings, which makes the establishment of the connection between the accessory and the pushchair particularly effective and safe. Once connected, the accessory is securely connected to the pushchair owing to the cooperation by shape complementarity between the male elements, kept in the connection position by the mechanism, and the female housings integrated into the frames of the pushchair. When the male elements are kept in the disconnection position by the mechanism urged manually to that end, the accessory can be freely released with respect to the frame of the pushchair, the female housings of which, then empty, do not affect the overall esthetics of the frame of the pushchair, since, by definition, these female housings are not protruding. Other advantages will emerge in the remainder of the present document.

According to one embodiment, the accessory according to the invention is a pushchair board, of the type mentioned above. As such, the accessory according to the invention may be made in other forms, as indicated hereinafter, its connection device also being able to be provided integrated permanently into the accessory, or borne removably by the chassis of the latter.

Additional advantageous features of the accessory and the transport assembly according to the invention are specified in the other claims.

The invention will be better understood upon reading the following description, provided solely as an example and done in reference to the drawings, in which.

Figure 1:
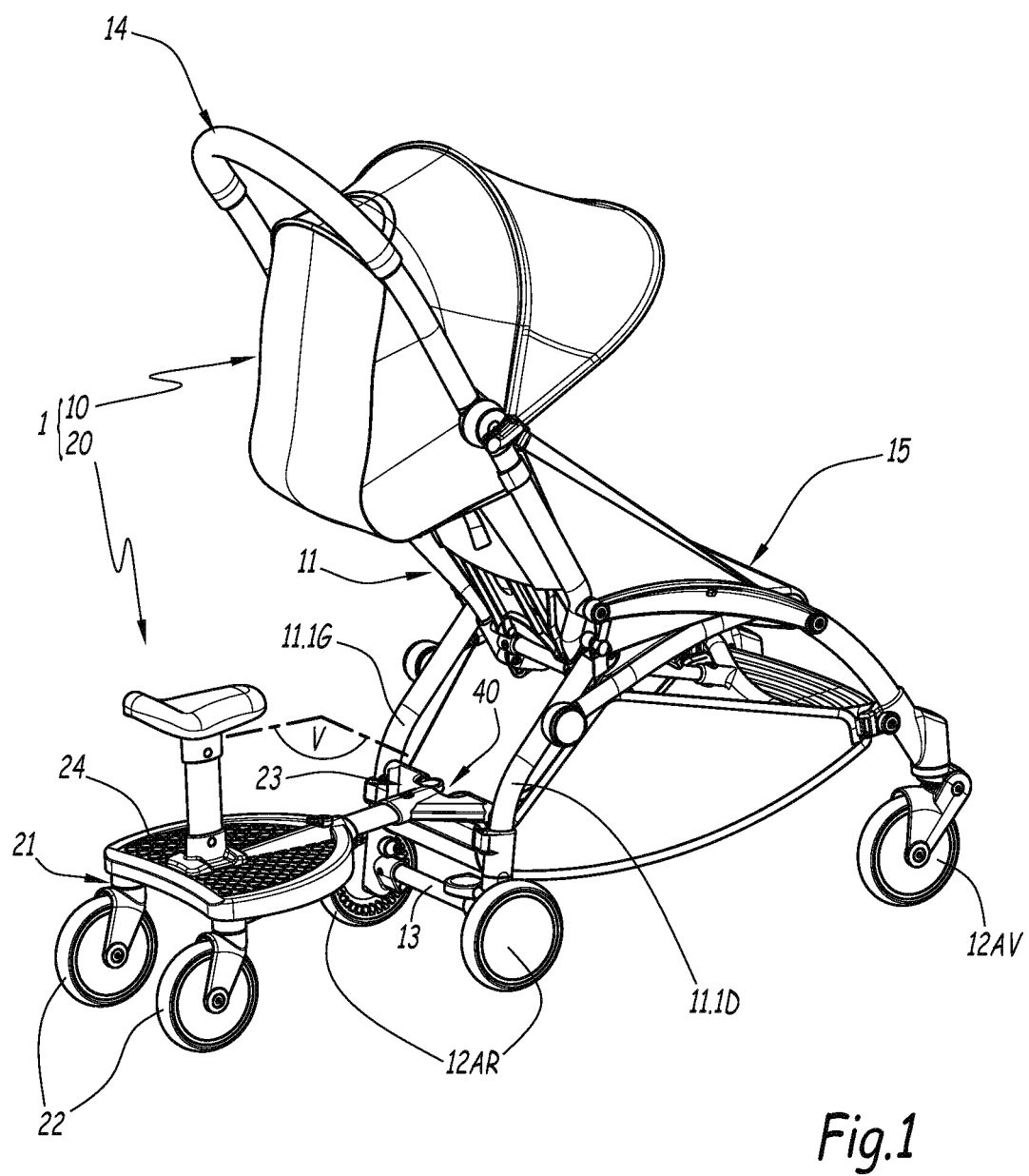
FIG. 1 is a perspective view of a transport assembly according to the invention.
Figure 3:
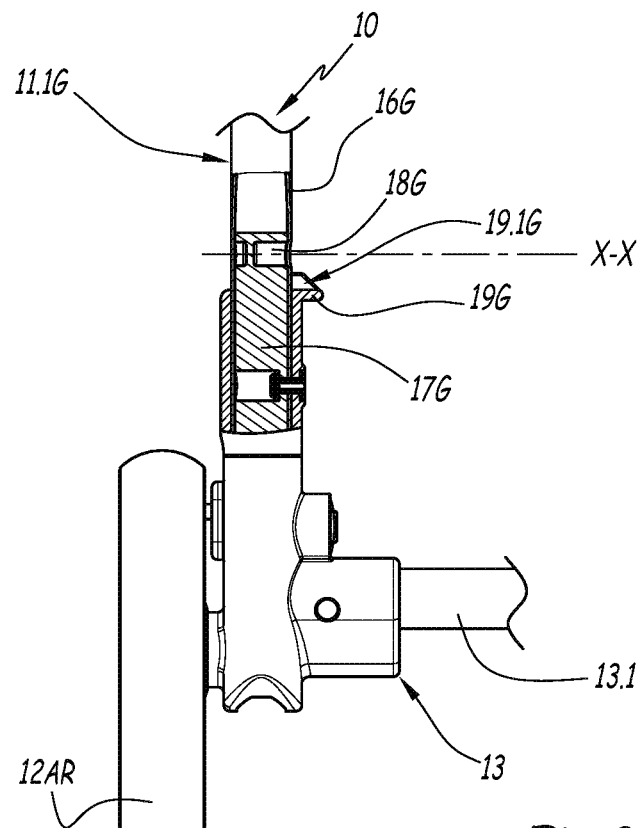
FIG. 3 is a schematic elevation view of a part of the pushchair of FIG. 2, with partial section along plane Ill of FIG. 2.
Figure 4:
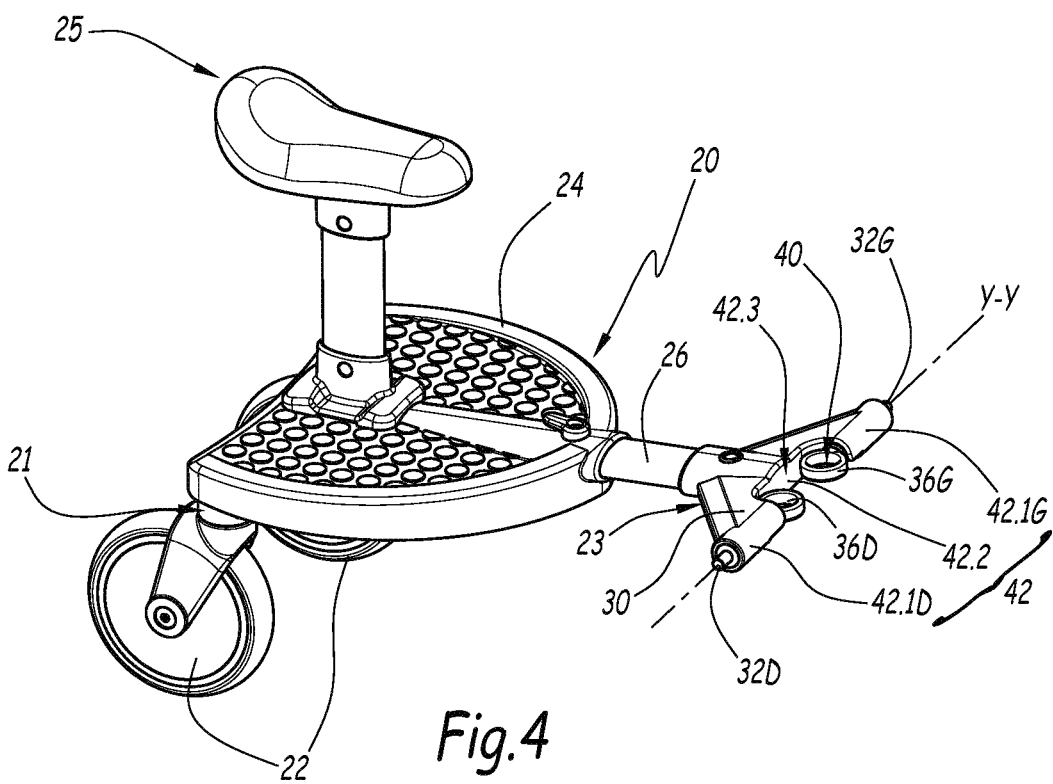
FIG. 4 is a perspective view of an accessory belonging to the transport assembly of FIG. 1, this accessory being shown alone.
Figure 5:
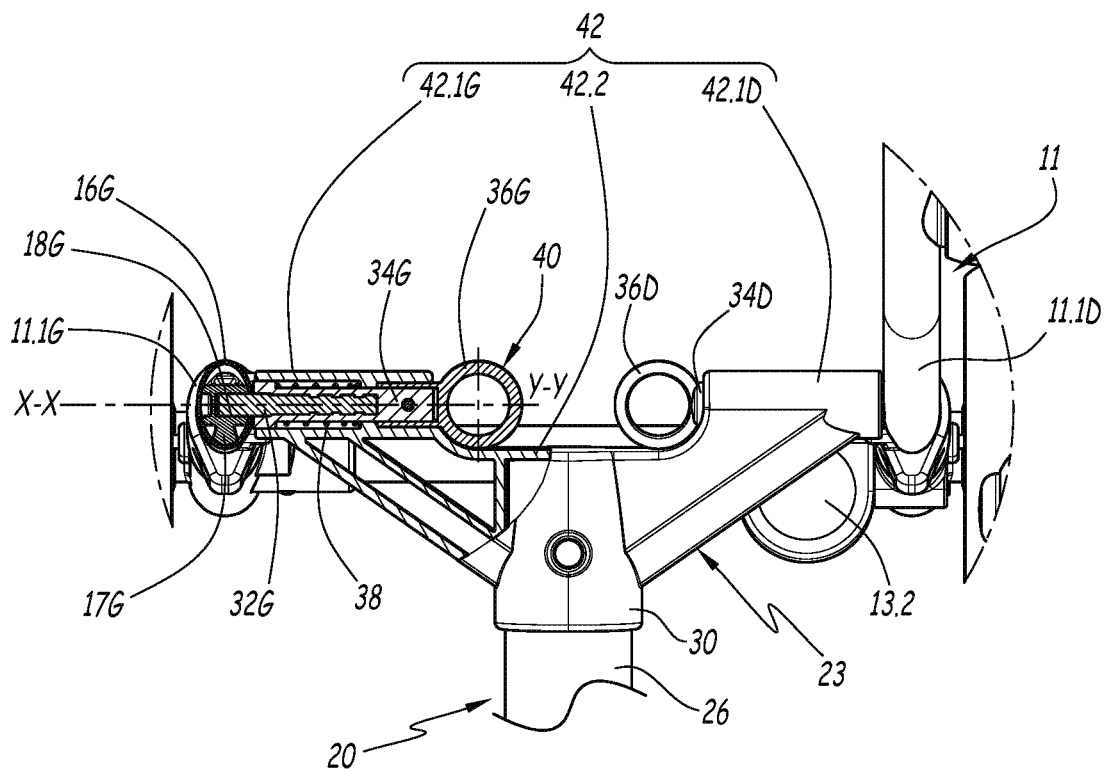
FIG. 5 is a schematic elevation view of a part of the transport assembly of FIG. 1, with partial section along plane V of FIG. 1.

FIGS. 1 to 6 show a transport assembly 1 comprising a pushchair 10 and a pushchair accessory 20. In FIGS. 1 and 5, the accessory 20 is connected to the pushchair 10, as described in more detail hereinafter, while in the other figures, the accessory 20 is disconnected from the pushchair 10.

Outside the developments to the pushchair 10 that allow the connection between the latter and the accessory 20, the pushchair 10 may typically fall under what is known. Thus, the pushchair 10 includes a frame 11, forming a support framework and for example made primarily by an assembly of tubes, the corresponding tubular structure advantageously being able to be folded on itself to transition the frame 11 from a deployed usage configuration, as shown in FIG. 1, to a folded storage configuration. On its side which, during use, is normally facing downward, the frame 11 is provided with bearing wheels for rolling on the ground, these wheels including one or several front wheels 12AV and rear wheels 12AR. In the example embodiment considered in the figures, two rear wheels 12AR are provided, while respectively being situated on the left and right sides of the frame 11, as clearly shown in FIGS. 1 to 3. Irrespective of the number of rear wheels 12AR, said rear wheels 12AR are advantageously supported by a rear train 13 of the frame 11: in the example considered here, this rear wheel train 13 advantageously includes an axle bar 13.1 that, as clearly shown in FIGS. 2 and 3, has opposite ends supporting respective hubs of the rear wheels 12AR. Aside from the developments to the frame 11 making it possible to connect the accessory 20 to the pushchair 10, which will be described in more detail hereinafter, the frame 11 has an embodiment that is not limiting with respect to the invention.

In a manner known in itself for a pushchair, the frame 11 of the pushchair 10 is also provided with:

a pushing member 14, such as a bar, handles, etc., said pushing member 14 allowing an adult walking behind the pushchair 10 to push the frame 11 forward, causing the latter to roll on the ground by its wheels 12AV and 12AR; and a receiving member 15, such as a seat, a basket, a bassinet, etc., this receiving member 15 making it possible to receive a child to be conveyed by the pushchair 10, the child being installed in said receiving member 15 in the seated position, the reclining position or in a position midway between the latter.

The pushing member 14 in the receiving member 15 have embodiments that are not limiting with respect to the invention. Furthermore, said pushing member and/or said receiving member 15 may assume additional developments, known as such. As an example, the receiving member 15 may be borne removably by the frame 11.

Figure 2:
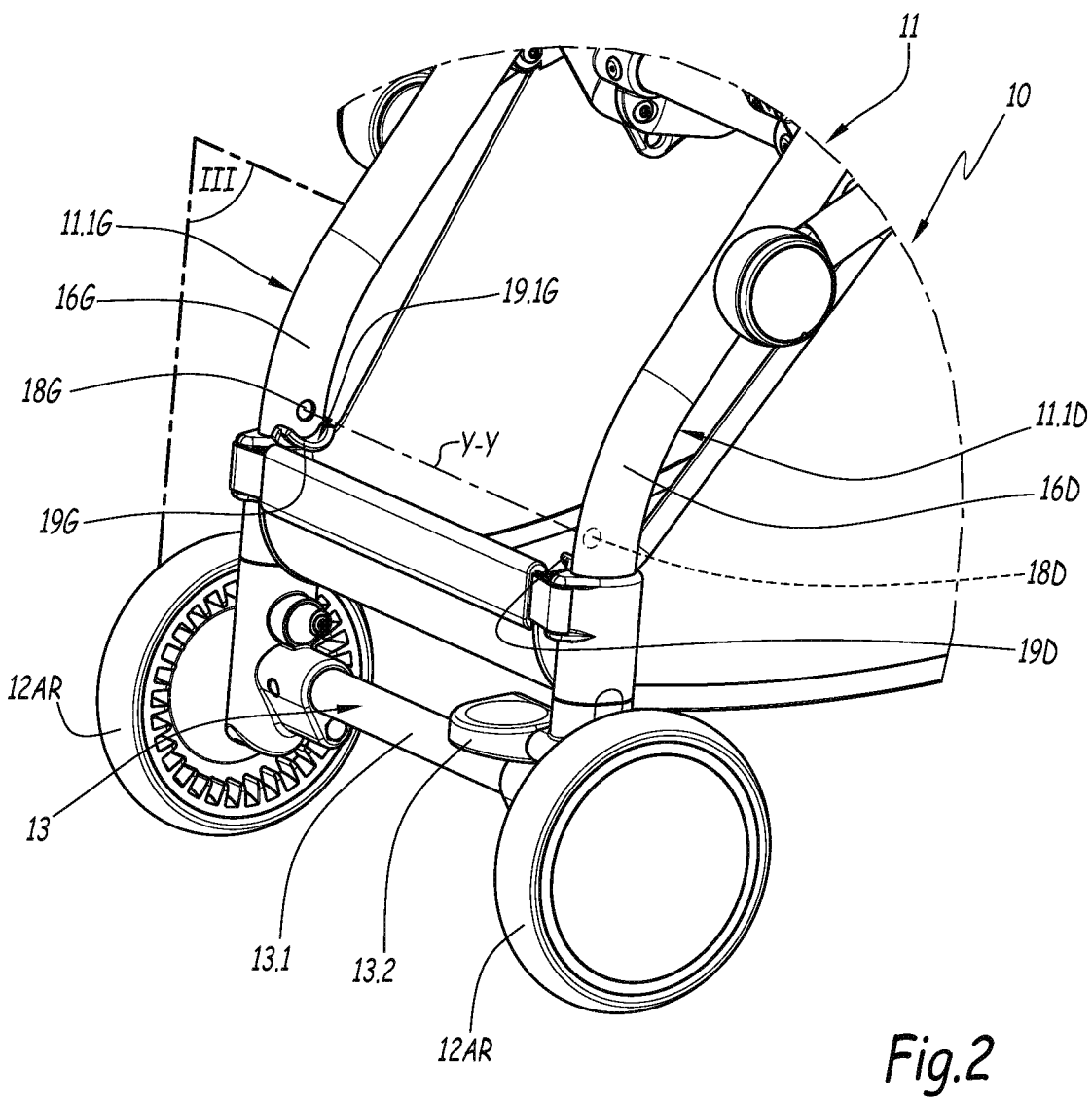
FIG. 2 is a perspective view of a rear part of the pushchair of the transport assembly of FIG. 1, this pushchair being shown alone.

In the example embodiment considered here, as clearly shown in FIGS. 2 and 3, respective left 11.1G and right 11.1D rear parts of the frame 11 include respective uprights, namely a left upright 16G and a right upright 16D. These uprights 16G and 16D are parallel to one another, extending upward from the rear wheel train 13. As shown in FIG. 3 for the left upright 16G, each of said uprights 16G and 16D is inwardly provided with an insert 17G that reinforces the corresponding upright and that forms a mechanical link between the corresponding upright and the rear wheel train 13, in particular between said upright and the corresponding end, respectively left or right, of the axle bar 13.1 of said train 13. The developments of the link between the rear wheel train 13 and the respective inserts of the uprights 16G and 16D are not limiting, inasmuch as these developments effectively pass on, to the rear wheel train 13, the loads applied to the uprights 16G and 16D, more generally to the left rear parts 11.1G and 11.1D of the frame 11, in particular by imparting a high level of robustness to the rigid assembly interface between the left 11.1G and right 11.1D rear parts of the frame 11 with the rear wheel train 13 of said frame.

For reasons that will appear later, the left 11.1G and right 11.1D rear parts of the frame 11 are each provided with a female housing 18G, 18D. As clearly shown in FIGS. 2 and 3, these female housings 18G and 18D are respectively hollowed in a face of the left upright 16G and a face of the right upright 16D, which are opposite one another, and respectively extend in the thickness of the inner inserts of said uprights. In other words, the female housings 18G and 18D are, for the most part, respectively delimited by the inner inserts of the uprights 16G and 16D, emerging on the outside of said uprights while passing through the respective portions of the uprights 16G and 16D, turned toward one another, as clearly shown in FIG. 3 for the left upright 16G, its insert 17G and the female housing 18G. As clearly shown in FIG. 2, the female housings 18G and 18D are advantageously centered on a same geometric axis X-X extending perpendicular to the uprights 16G and 16D.

According to one optional arrangement, the interest of which will also appear later, the frame 11 is provide with cradles, respectively left 19G and right 19D, which are respectively associated with the female housings 18G and 18D. As clearly shown in FIG. 2, these cradles 19G and 19D are arranged below the female housings 18G and 18D: the cradles 18G and 18D thus delimit respective upper surfaces, for which that of the cradles 19G is visible in FIGS. 2 and 3 and is referenced 19.1G, which protrude from the corresponding upright 16G, 16D, while surrounding a lower portion of the perimeter of the corresponding female housing 18G, 18D in a manner concentric to the axis X-X. In the example embodiment considered in the figures, the cradles 19G and 19D are integrated into the rear wheel train 13, while respectively being integrated into the opposite ends of the axle bar 13.1. Other embodiments can be considered inasmuch as, during use, the cradles 19G and 19D are fixedly supported by the frame 11.

As clearly shown in FIGS. 1 and 4, the accessory 20 includes a chassis 21 that is primarily provided with:
- on the side of the chassis 21 that, during use, is turned toward the ground, one or several bearing wheels 22 rolling on the ground, and
- on the front side of the chassis 21, a device 23 that, as explained in more detail hereinafter, allows the reversible connection of the accessory 20 to the frame 11 of the pushchair 10.

In the example embodiment considered in the figures, the wheels 22 are provided in duplicate, while both being located behind the chassis 21. These two wheels 22 are advantageously provided to be omnidirectional, having specified that here, "omnidirectional wheel" refers to a wheel whose rotation axis, around which said wheel rotates around itself when it rolls on the ground, is provided, typically via a yoke supporting the rotation axis on either side of the wheel, freely pivoting relative to the rest of the chassis 21 around a pivot axis that extends radially or orthoradially to the rotation axis, such that the wheel can, independently of its rolling around its rotation axis, pivot around the pivot axis and thus modify the orientation of the wheel relative to the rest of the chassis 21 and therefore the direction of advance for the chassis on the ground. This type of wheel, here called omnidirectional wheel, is also called "pivoting caster". This being the case, the number, the position and the inherent developments of the wheels 22 of the accessory 20 are not limiting and may differ from the example considered here.

In the embodiment considered in the figures, the chassis 21 includes a platform 24 which, when the accessory 20 is connected to the frame 11 of the pushchair 10 by the device 23, extends globally horizontally, in particular for its face turned upward. During use, said platform 24 makes it possible to receive a child standing on the face of the platform, facing upward. According to one optional arrangement, shown in FIGS. 1 and 4, the platform 24 is equipped with a seat 25 on which a child standing on the platform 24 can sit. In other words, when the accessory 20 is connected to the pushchair 10, the chassis 21 may, while rolling on the ground via its wheels 22, support a child standing up or sitting on the platform 24. The accessory 20 is thus comparable to a pushchair board, like those mentioned in the introductory part of the present document. In practice, and non-limitingly, the seat 25 may be provided to be removable with respect to the rest of the platform 24. More generally, the developments of the platform 24 relative to the reception and installation of a child conveyed by the accessory 20 are not limiting with respect to the invention.

Figure 6:
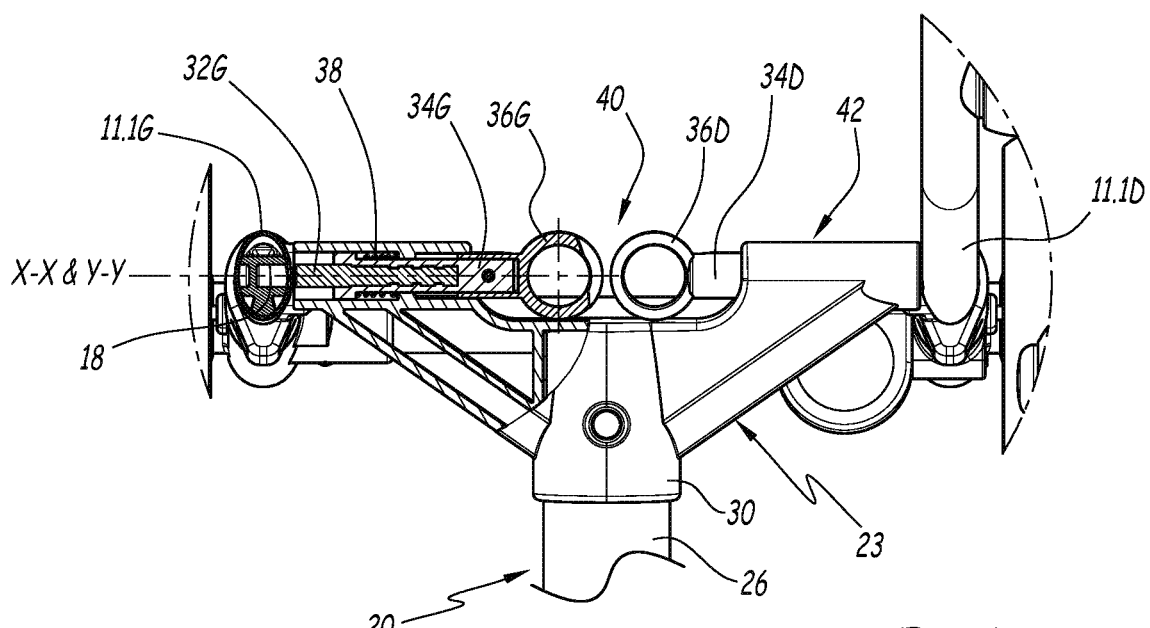
FIG. 6 is a view similar to FIG. 5, showing the transport assembly in a different functional configuration from that of FIG. 5.

In order to connect the accessory 20 to the pushchair 10, the device 23 of the accessory 20 is connected at the left 11.1G and right 11.1D parts of the frame 11, in particular between the left 16G and right 16D uprights, as shown in FIGS. 1, 5 and 6. To minimize the bulk of the accessory 20 in the immediate vicinity of the frame 11, the chassis 21 advantageously includes a rod 26: as shown in FIGS. 1 and 4 to 6, said rod 26 extends the platform 24 forward and the front end of the rod 26 bears the device 23. Thus, on either side of the rod 26, the latter leaves the access to the rear, respectively left and right, flanks of the frame 11 free. In the example embodiment considered in the figures, this development thus leaves the access to a braking control member 13.2 of the pushchair 10 free, borne by the right part of the rear wheel train 13, as clearly shown in FIGS. 5 and 6.

As shown in FIGS. 4 to 6, the device 23 includes a support 30, which, during use, is fixedly connected to the chassis 21, in particular the front end of the rod 26 in the example considered here. In practice, the fixed connection between the support 30 and the chassis 21 can be done either permanently, the support 30 then being irretrievably borne by the chassis 21, or removably, the support 30 and, as a result, the device 23 then being able to be detached from the chassis 21, more generally detached from the rest of the accessory 20. In other words, the device 23 can be permanently integrated into the accessory 20, or separable from the rest of the accessory 20. The corresponding developments of the device 23 and the chassis 21, which produce the fixed connection between them when the accessory 20 is in use, are not limiting with respect to the invention and are implemented by arrangements known in themselves, which will not be described in more detail here.

The device 23 also includes two male elements, respectively left 32G and right 32D, visible in FIGS. 4 to 6. Each of the male elements 32G and 32D is supported by the support 30 movably relative to the chassis 21, between a connection position, which is shown in FIGS. 4 and 5 and in which the male element 32G, 32D is deployed with respect to the support 30, and a disconnection position, which is shown in FIG. 6 and in which the male element is retracted with respect to the support 30. When the device 23 is attached to the left 11.1G and right 11.1D rear parts of the frame 11, in particular between the uprights 16G and 16D, more specifically at the female housings 18G and 18D, the male elements 32G and 32D are, in the connection position, respectively received in the female housings 18G and 18D, as shown in FIG. 5 for the left male element 32G and the left female housing 18G, while the male elements 32G and 32D are, in the disconnection position, outside the female housings 18G and 19G, as shown in FIG. 6 for the left male element 32G and the left female housing 18G. Each of the male elements 32G and 32D is provided to be complementary, to within any functional play, to the female housing 18G, 18D with which it is associated, so as to be received in said housing in a complementary manner, as shown in FIG. 5. As a non-limiting example, the male elements 32G and 32D comprise, or even consist of pins, with the understanding that various embodiments can be considered as long as they guarantee shape complementarity between the male elements and the female housings 18G and 18D.

According to one particularly advantageous practical arrangement, the male elements 32G and 32D are centered on a same geometric axis Y-Y and are translatable along said axis Y-Y between their connection position and their disconnection position. When the device 23 is attached to the rear parts 11.1G and 11.1D of the frame 11 at their female housing 18G and 18D to connect the accessory 20 to the pushchair 10, the axis Y-Y of the male elements 32G and 32D is substantially combined with the axis X-X of the female housings 18G and 18D, as shown in FIGS. 5 and 6. To go from its disconnection position to its connection position, each of the male elements 32G and 32D translates along the axis Y-Y inside the corresponding female housing 18G, 18D, while to go from its connection position to its disconnection position, each of the male elements 32G and 32D also translates along the axis Y-Y, but in the opposite direction so as to completely exit the corresponding female housing 18G, 18D. For the example embodiment considered in the figures, since the female housings 18G and 18D are axially across from one another, the translation directions along which the male elements 32G and 32D go from their connection position to their disconnection position are opposite one another: in other words, when the male elements 32G and 32D translate from their connection position to their disconnection position, they come close to one another along the axis Y-Y, as shown by comparing FIGS. 5 and 6.

According to one advantageous optional arrangement, which is implemented in the example embodiment considered here, each of the male elements 32G and 32D and its corresponding female housing 18G, 18D are configured to pivot relative to one another around the axis Y-Y when the male element is in the connection position. In practice, the male elements 32G and 32D and the female housings 18G and 18D to that end have a complementary cylindrical configuration, centered on the axes X-X and Y-Y. Irrespective of the specificities of the respective developments of the male elements 32G and 32D and female housings 18G and 18D allowing this pivoting, a pivot link around the axis Y-Y, between the device 23 and the frame 11, is thus formed jointly by the male elements 32G and 32D in the connection position in the female housings 18G and 18D: as a result, when the accessory 20 is connected to the pushchair 10, obstacle crossing, and more generally, movement on irregular ground, are made easier for the transport assembly 1, by free relative pivoting between the pushchair 10 and the accessory 20 around the axis Y-Y.

The device 23 further includes members, respectively left 34G and right 34D, making it possible to drive, respectively, the male elements 32G and 32D manually from their connection position to their disconnection position. Each of the members 34G and 34D is kinematically linked to the corresponding male element 32G, 32D between the connection position and the disconnection position of said male element. In practice, the embodiment for this kinematic link is not limiting with respect to the invention. According to one practical form, which is implemented in the example considered here, each of the members 34G and 34D is fixedly secured to the corresponding male element 32G, 32D, in particular the part of the latter that is not introduced inside the corresponding female housing 18G, 18D when it is in the connection position. As an example, each of the members 34G and 34D thus includes a bar inside which is secured, for example by fitting or overmolding, the aforementioned part of the corresponding male element 32G, 32D, as shown in FIGS. 5 and 6. In an alternative that is not shown, each of the male elements 32G and 32D and its associated member 34G, 34D can also be in a single piece.

In practice, the support 30 supports the members 34G and 34D, while allowing their movement for the purposes of the manual driving of the male elements 32G and 32D.

Irrespective of the embodiment of each of the members 34G and 34D, this member is provided with a relief 36G, 36D allowing the gripping, and thus the control of the movement of the corresponding member, by the hand of a user. According to one practical and relatively non-cumbersome embodiment, implemented in the example considered here, the reliefs 36G and 36D are respectively borne by the end of the corresponding member 34G, 34D, opposite the corresponding male element 32G, 32D.

In all cases, the reliefs 36G and 36D are configured to be urged jointly by a same hand of a user to command the joint movement of the members 34G and 34D, and thereby to jointly drive the male elements 32G and 32D from their connection position to their disconnection position. To that end, the embodiment of the reliefs 36G and 36D is not limiting as long as the same hand of the user can jointly urge the two reliefs 36G and 36D such that, on the one hand, this urging can be started while both of the male elements 32G and 32D are in their connection position, and on the other hand, this urging can be continued until driving, via the members 34G and 34D, the two male elements 32G and 32D to their disconnection position. In practice, multiple geometric configurations can be considered for the reliefs 36G and 36D: in the example embodiment considered in the figures, the reliefs 36G and 36D each comprise an eyelet with a circular profile, which, as an alternative that is not shown, could have an oval, rectangular, square, arbitrary pattern, etc. profile. Also as an alternative that is not shown, rather than having a closed profile like the eyelets considered in the figures, the reliefs 36G and 36D may have open profiles, for example in the shape of a "U", a "C", arbitrary patterns, etc.

To facilitate their manual gripping, the reliefs 36G and 36D are advantageously sized each to be urged by one of the user's fingers: thus, the reliefs 36G and 36D can then be urged respectively by two fingers of a same hand of the user to jointly drive the two male elements 32G and 32D. This arrangement can be implemented by the various aforementioned geometric configurations for the reliefs 36G and 36D, once each of these reliefs is dimensioned in connection with the size of a human finger.

In the extension of the preceding considerations, and in the embodiment, like that shown in the figures, where the male elements 32G and 32D are translatable along the axis Y-Y coming closer to one another to go from their connection position to their disconnection position, the members 34G and 34D, also translatable along the axis Y-Y, advantageously have their reliefs 36G and 36D come closer to one another along the axis Y-Y when they are urged manually to jointly drive the male elements 32G and 32D from their connection position to their disconnection position: by respectively urging the reliefs 36G and 36D by two fingers of a same hand, such as the thumb and the index finger, the user can thus easily drive the male elements 32G and 32D from their connection position to their disconnection position, by bringing his two fingers together, i.e., by bringing them closer to one another, typically by performing a pinching motion with his hand, this tightening causing the approach, along the axis Y-Y, of the reliefs 36G and 36D, as shown by comparing FIGS. 5 and 6.

The device 23 also includes springs, namely a left spring and a right spring, only the left spring being visible in FIGS. 5 and 6 under reference 38. These two springs are supported by the support 30. Subsequently, only the left spring 38 is described in detail, having noted the right spring is similar to the left spring 38, by cooperating with the right part of the device 23 in the same way that the left spring cooperates with the left part of said device 23. The left spring 38 is mechanically inserted between the left member 34G and the support 30 so as to resiliently return said member 34G to transition the left male element 32G from its disconnection position to its connection position when there is no urging on the relief 36G. In the example embodiment considered in the figures, the left spring 38 is a compression spring that is supported by the support 30 so as to work in extension, in particular along the axis Y-Y, between said support 30 and the member 34G: when the member 34G is commanded in movement by manual urging by the user to drive the left male element 32G from its connection position to its disconnection position, the spring 38 is compressed, in particular by shortening its dimension along the axis Y-Y, such that when the manual urging is relaxed, the spring 38 relaxes resiliently and therefore automatically commands the movement of the member 34G in the opposite direction, in other words so as to drive the left male element 32G from its disconnection position to its connection position. Of course, other embodiments can be considered for the spring 38 as long as they guarantee the resilient return of the left male element 32G from its disconnection position to its connection position. Irrespective of its embodiment, it is understood that the spring 38 resiliently keeps the left male element 32G in its connection position as long as the user does not apply a manual urging to the member 34G overcoming the resilient resistance of the spring 38 in order to drive the left male element 32G from its connection position to its disconnection position.

It will be recalled that, as indicated above, the right spring of the device 23, not visible in the figures, produces, on the right male element 32D and the member 34D, an effect similar to that produced by the left spring 38 on the left male element 32G and the member 34G.

Taking into account the explanations given thus far, it will be understood that the members 34G and 34D and the left 38 and right springs of the device 23 together form a mechanism 40 making it possible to actuate the male elements 32G and 32D such that:

by urging said mechanism 40, in particular at its reliefs 36G and 36D, applied by a single hand of the user, the mechanism 40 drives, in particular via its members 34G and 34D, jointly, the male elements 32G and 32D from their connection position to their disconnection position, and when no manual urging is applied to the mechanism 40, the latter automatically returns, in particular via its left 38 and right springs, the male elements 32G and 32D from their disconnection position to their connection position.

Of course, the embodiment of the mechanism 40, based on the members 34G and 34D and the left 38 and right springs, is only one possible constructive example of said mechanism 40, multiple embodiments, based on the variants mentioned thus far as well as on the general knowledge of one skilled in the art, being able to be considered inasmuch as all of these embodiments actuate the male elements 32G and 32D in the manner described just above.

According to one advantageous optional arrangement, which is implemented in the example considered in the figures and which makes it possible for the male elements 32G and 32D to be moved along a controlled trajectory between their connection position and their disconnection position, the support 30 is designed in order, in addition to supporting the male elements 32G and 32D and the mechanism 40, to guide the movement of said mechanism and/or said male elements. In particular, the support 30 to that end comprises a sheath 42, which extends along the axis Y-Y, while being centered on said axis, and which includes two opposite end parts, namely a left end part 42.1G and a right end part 42.1D, connected to one another by a running part 42.2 of the sheath 42, as shown in FIGS. 4 to 6.

The end parts 42.1G and 42.1D are respectively provided so that the male ends 32G and 32D in the connection position deploy axially outside them, as shown in FIGS. 4 and 5, and so that the male elements 32G and 32D in the disconnection position retract inside them, as shown in FIG. 6. Furthermore, these end parts 42.1G and 42.1D receive, inside them, respectively the members 34G and 34D, while cooperating by shape complementarity with said members to guide them in translation along the axis Y-Y, this cooperation by shape complementarity being for example provided between an inner diameter of the end parts 42.1G and 42.1D and an outer diameter of the members 34G and 34D. Furthermore, these end parts 42.1G and 42.1D house, advantageously in full, the left spring 38, and respectively, the right spring of the device 23, while forming a bearing, in particular axial, for said spring. Furthermore, in particular for the manual stress on the reliefs 36G and 36D to be applied easily and comfortably by the user, the running part 42.2 of the sheath 42 forms a notch 42.3, which, as shown in FIGS. 4 to 6, allows the user's hand to access the reliefs 36G and 36D to grasp them and urge them, in particular respectively using two fingers of his hand.

It will be noted that the notch 42.3 may advantageously be configured such that, when the male elements 32G and 32D are in the disconnection position, the members 34G and 34D are partially visible inside said notch in the direction where the end of each member 34G, 34D, turned toward the other member 34D, 34G, is arranged outside the corresponding end part 42.1G, 42.1D of the sheath 42 and, as a result, inside the notch 42.3, as shown in FIG. 6, whereas, when the male elements 32G and 32D are in the connection position, the members 34G and 34D are, for the most part or even entirely, outside the notch 42.3, while being housed entirely or practically entirely inside the end parts 42.1G and 42.2G of the sheath 42, as shown in FIG. 5. The fact that the members 34D and 34G are partially visible in the notch 42.3 when the male elements 32G and 32D are in the disconnection position and are, at least for the most part, not visible in said notch when the male elements are in the connection position, may be used by the user to guarantee that the male elements are in fact in the position desired by the user. In particular, when the user releases any manual urging on the connection device 23 after having attached it between the uprights 16G and 16D of the pushchair 10 in order for the male elements to go automatically from their disconnection position to their connection position to engage with the female housings 18G and 18D, the user can, by observing the notch 42.3, visually verify that the members 34G and 34D have disappeared inside the end parts 42.1G and 42.1D of the sheath 42, like in FIG. 5: if one and/or the other of the members 34G and 34D remain visible in the notch like in FIG. 6, one and/or the other of the male elements 32G and 32D are not or are incorrectly engaged in the associated female housing 18G, 18D, for various unforeseeable reasons, which will then notify the user of the effective or complete connection flaw between the accessory 20 and the pushchair 10. In practice, to facilitate this visual inspection, the end of each member 34G, 34D, which is turned toward the other member 34D, 34G and which is visible in the notch 42.3 when the male elements 32G and 32D are in the disconnection position, can be colored or provided with a warning pattern, such as a colored arrow, for example.

Outwardly, the sheath 42 is advantageously dimensioned to facilitate the positioning of the device 43 opposite the rear parts 11.1G and 11.1D of the frame 11 of the pushchair 10. More specifically, as shown in FIGS. 5 and 6, the total dimension, along the axis Y-Y, of the sheath 42 is equal, to within any functional play, to the distance separating, along the axis X-X, the respective mouths of the female housings 18G and 18D: thus, when the male elements 32G and 32D are in the disconnection position, the sheath 42 can be arranged between the rear parts 11.1G and 11.1D of the frame 11, in particular between the uprights 16G and 16D, with its axis Y-Y parallel to the axis X-X. Furthermore, the respective outer faces of the end parts 42.1G and 42.1D of the sheath 42 are advantageously sized to respectively interfere with the cradles 19G and 19D, by positioning themselves, by shape complementarity, against the respective upper surfaces of said cradles, such as the surface 19.1G of the cradle 19G, so as to align the axes Y-Y and X-X: by accommodating the outer faces of the end parts 42.1G and 42.1D of the sheath 42 in a complementary and concentric manner, the upper surfaces of the cradles 19G and 19D align the female housings 18G and 18D with the male elements 32G and 32D, thus positioning said housings on the trajectory of the male elements when the latter go from their disconnection position to their connection position.

The use of the transport assembly 1 is as follows.

When the transport assembly 1 is in the configuration shown in FIGS. 1 and 5, i.e., when the accessory 20 is connected to the pushchair 10 by means of the device 23, this transport assembly 1 makes it possible to convey both a child in the pushchair 10 and another child on the accessory 20: the first child is installed in the receiving member 15, while the second child stands or is seated on the platform 24 of the accessory 20. An adult is able to roll the transport assembly 1 on the ground, by pushing the pushing member 14: the pushchair 10, thus driven forward, pulls the accessory 20 by means of the device 23, in particular by cooperation between the male elements 32G and 32D in the connection position and the female housings 18G and 18D receiving said male elements. The transmission of the traction forces is effective and lasting, the corresponding stresses effectively being absorbed by the uprights 16G and 16D, and above all, the inserts 17G and 17D that pass these stresses on to the rear wheel train 13. Thus, the transport assembly 1 is particularly robust. During the rolling of the transport assembly 1 on irregular ground, for example when crossing an obstacle, the pushchair 10 and the accessory 20 remain firmly connected, while being able to pivot relative to one another around the axis Y-Y by cooperation between the male elements 32G and 32D and the female housings 18G and 18D: this pivoting is free, in particular without interference abutment between the sheath 42 of the support 30 and the cradles 19G and 19D of the frame 11 due to the fact that their respective surfaces, facing one another, are complementary and concentric. It advantageously results that the accessory 20 can even be pivoted upward around the axis Y-Y, while being unstuck from the ground, until being folded down against the rear of the pushchair 10: this folded configuration of the accessory, which can be maintained by strapping or the like, is only implemented when the accessory is not in use, without the user wishing to disconnect the accessory from the pushchair.

When the user wishes to free the accessory 20 from the pushchair 10, he only uses one of his two hands to stress the reliefs 36G and 36D, in particular by causing two fingers of his hand to cooperate respectively with the relief 36G and the relief 36D: with this hand alone, the user then stresses the mechanism 40 in order, as explained above, to jointly drive the male elements 32G and 32D from their connection position, shown in FIG. 5, to their disconnection position, shown in FIG. 6, while overcoming the resilient stress opposed by the left 38 and right springs of the device 23. Once these male elements 32G and 32D are in their disconnection position, the user brings the accessory 20, still using only his hand stressing the mechanism 40, so as to free the accessory 20 with respect to the frame 11 of the pushchair, in particular by taking the support 30 out from between the uprights 16G and 16D of said frame.

When the user wishes to reconnect the accessory 20 to the pushchair 10, he implements the reverse gestures from those described just above, advantageously by carrying the accessory 20 and stressing the mechanism 40 using one and the same hand. The relative positioning between the pushchair 10 and the accessory 20, in particular the positioning of the female housings 18G and 18D with respect to the male elements 32G and 32D in the disconnection position just before these male elements are returned automatically to their connection position by the mechanism 40 when the user is going to release his manual stress, is made easier by the respective upper surfaces of the cradles 19G and 19D of the frame 11, as explained above.

Figure 7:
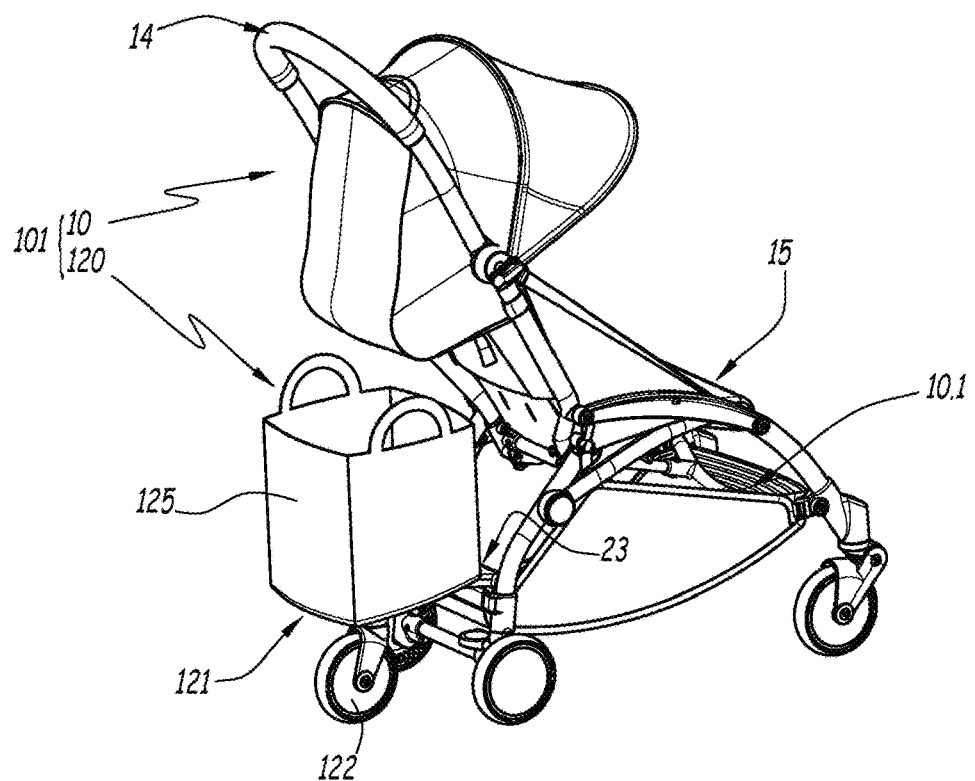
FIGS. 7 and 8 are views respectively similar to FIGS. 1 and 4, illustrating another embodiment of an accessory according to the invention, associated with the pushchair of the transport assembly of FIG. 1.
Figure 8:
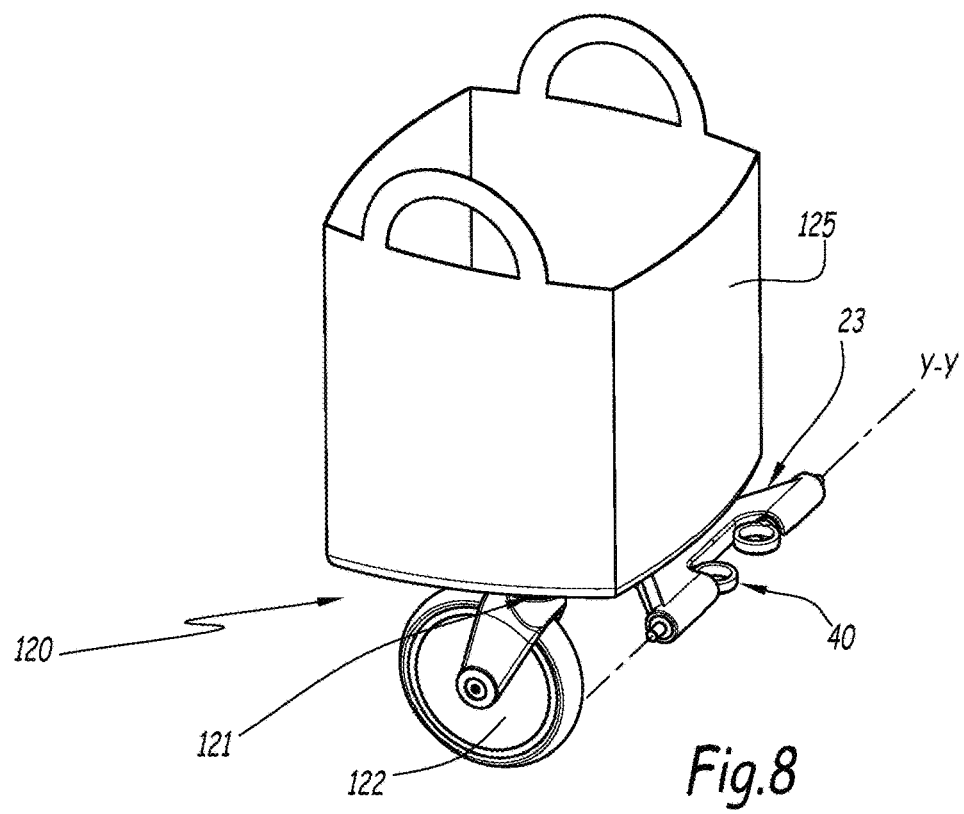

FIGS. 7 and 8 show a transport assembly 101 corresponding to an alternative embodiment of the transport assembly 1.

The transport assembly 101 includes the pushchair 10 previously described, as well as a pushchair accessory 120 different from the accessory 20.

More specifically, the accessory 120 includes a chassis 121 which, functionally similarly to the chassis 21 of the accessory 20, is provided with at least one bearing wheel for rolling on the ground 122. Furthermore, the chassis 121 bears the device 23 previously described, said device 23 allowing the reversible connection of the accessory 120 to the frame 11 of the pushchair 10, as illustrated by FIG. 7.

The accessory 120 differs from the accessory 20 by developments relative to its chassis 121, in that, rather than having a platform on which a child can stand and/or sit, the chassis 121 bears a tote bag 125 allowing various objects and goods to be stored that the user wishes to convey jointly with the pushchair 10. The accessory 120 is therefore comparable to a cart. Of course, the embodiment of the tote bag 125 is not limiting, and the depiction thereof done in FIGS. 7 and 8 is merely an illustration.

Irrespective of its embodiment, the tote bag 125 allows the transport assembly 101 to have a merchandise transport capability much greater than that of the pushchair 10 alone. Indeed, the pushchair 10 generally incorporates a basket or the like, such as a lower basket referenced 10.1 in FIG. 7 for the pushchair 10 considered here, said lower basket 10.1 being placed below the receiving member 15 and hooked to the frame 11. However, the transport capability of such a basket, for example the lower basket 10.1, is limited, in particular due to its installation within the push chair. Owing to the tote bag 125 of the accessory 120, the merchandise transport capability is increased practically and effectively, while maintaining comfort, esthetics and safety for the transport assembly 101.

According to one advantageous embodiment aspect, the total dimension of the chassis 121 in the front-back direction is provided to be short, to hinder the stride as little as possible of the adult pushing the pushchair 10 using its pushing member 14, and the wheel 122 is provided to be both omnidirectional and unique, while being located in the central region of the chassis 121. The maneuverability of the transport assembly 101 is then remarkable, the wheel 122 being able to support most of the load placed in the tote bag 125 that overhangs it.

According to another advantageous embodiment aspect, the bottom of the tote bag 125 is, on its face turned toward the chassis 121, provided with a protruding frustoconical element, converging downward, while the platform of the chassis 121 is, on its face turned toward the tote bag 125, provided with a frustoconical housing, which is complementary to the aforementioned frustoconical element and which is advantageously arranged vertically overhanging the wheel 122. The mechanical cooperation between the aforementioned element and frustoconical housing guarantees a precise placement and stable maintenance of the tote bag 125 on the chassis 121. Furthermore, this frustoconical element and housing are advantageously equipped with instantaneous reversible securing means, such as magnets and/or clips and/or hook and loop systems of the VELCRO type (registered trademark) and/or etc.: these instantaneous reversible securing means are provided to, at once, avoid the untimely separation of the tote bag 125 from the chassis 121, for example when the transport assembly 101 crosses an obstacle, rolls over irregular ground or follows a very curved trajectory, and to allow the user to separate the tote bag from the chassis when a stress is applied to the tote bag that is both strong enough and oriented in a predetermined direction, for example vertically upward. Of course, more generally, other respective developments to the bottom of the tote bag 125 and the platform of the chassis 121 can be considered to obtain, by cooperation between these developments, the effects explained above in terms of placement, maintenance and instantaneous reversible securing between said tote bag and said chassis.

According to one advantageous optional arrangement, a removable link can be added directly between the tote bag 125 and the frame 11 of the pushchair 10, for example in the form of straps, flanges, loops, fasteners of the VELCRO type, etc. This link strengthens the stability of the tote bag within the transport assembly 101 and/or keeps the tote bag in shape when it is empty or not very filled so as to prevent it from collapsing on itself due to the flexibility of its component material.

It will be noted that, according to considerations similar to those developed above regarding the fact that the accessory 20 can be pivoted upward around the axis Y-Y relative to the pushchair 10, while being unstuck from the ground, until being folded down toward the rear of the pushchair, the accessory 120 can, also owing to the cooperation between its device 23 and the frame 11 of the pushchair 10, be pivoted upward around the axis Y-Y relative to the pushchair 10, while being unstuck from the ground: the accessory 120 can then be folded down to the inside of the lower basket 10.1 of the pushchair, owing to the small anteroposterior dimension of the cart 21 and the flexibility of the component material of the tote bag 125, or the separation of the tote bag 125 with respect to the chassis 121.

FIGS. 9 to 15 show a transport assembly 201 corresponding to an alternative embodiment of the transport assembly 1 and the transport assembly 101. The transport assembly 201 can be considered an alternative of the transport assembly 101.

The transport assembly 201 includes the pushchair 10 previously described, as well as a pushchair accessory 220 that is different from the accessory 20 and which, similarly to the accessory 120, is comparable to a cart.

Figure 9:
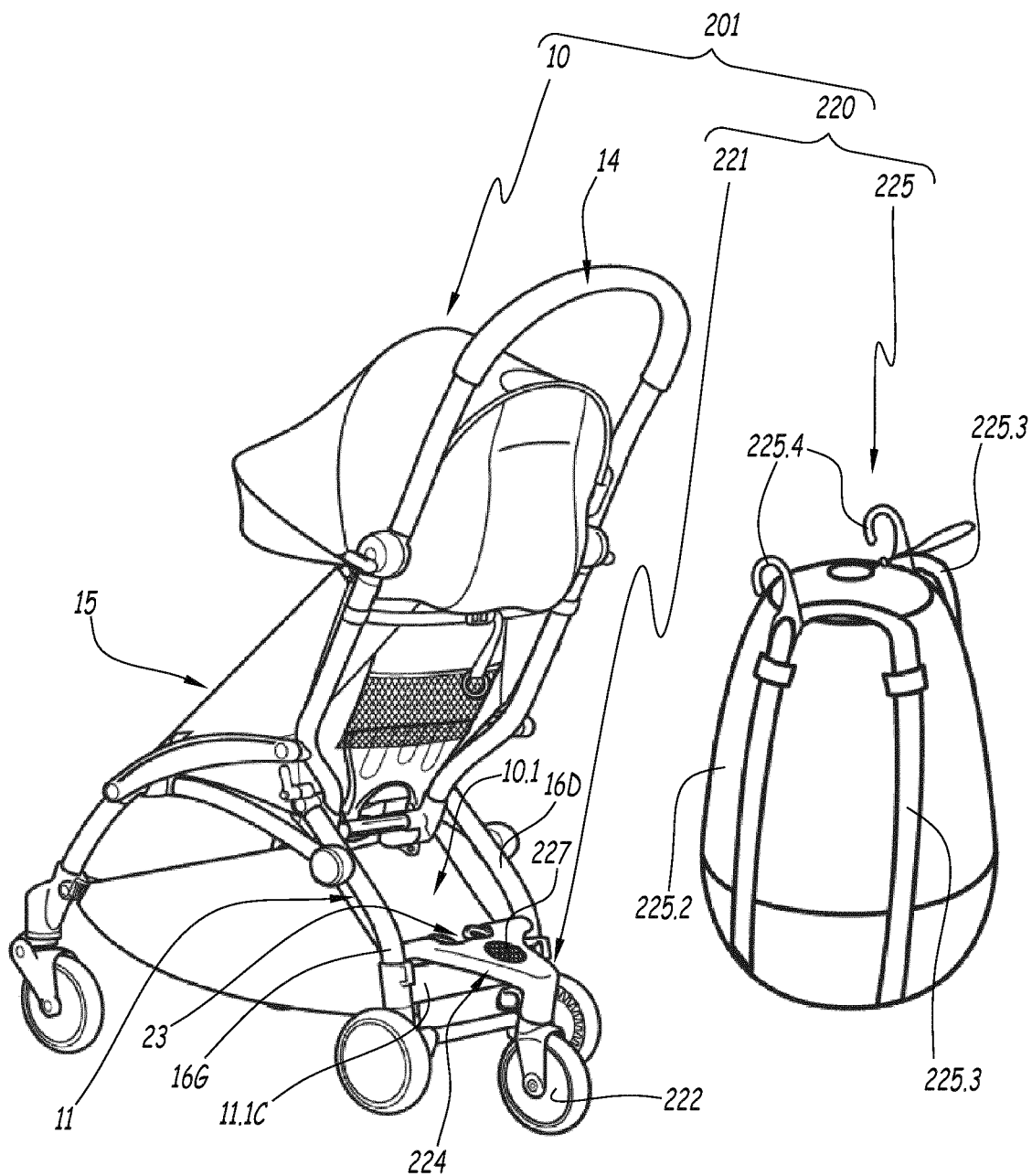
FIG. 9 is a view respectively similar to FIGS. 1 and 7, illustrating still another embodiment of an accessory according to the invention, associated with the pushchair of the transport assembly of FIG. 1.
Figure 10:
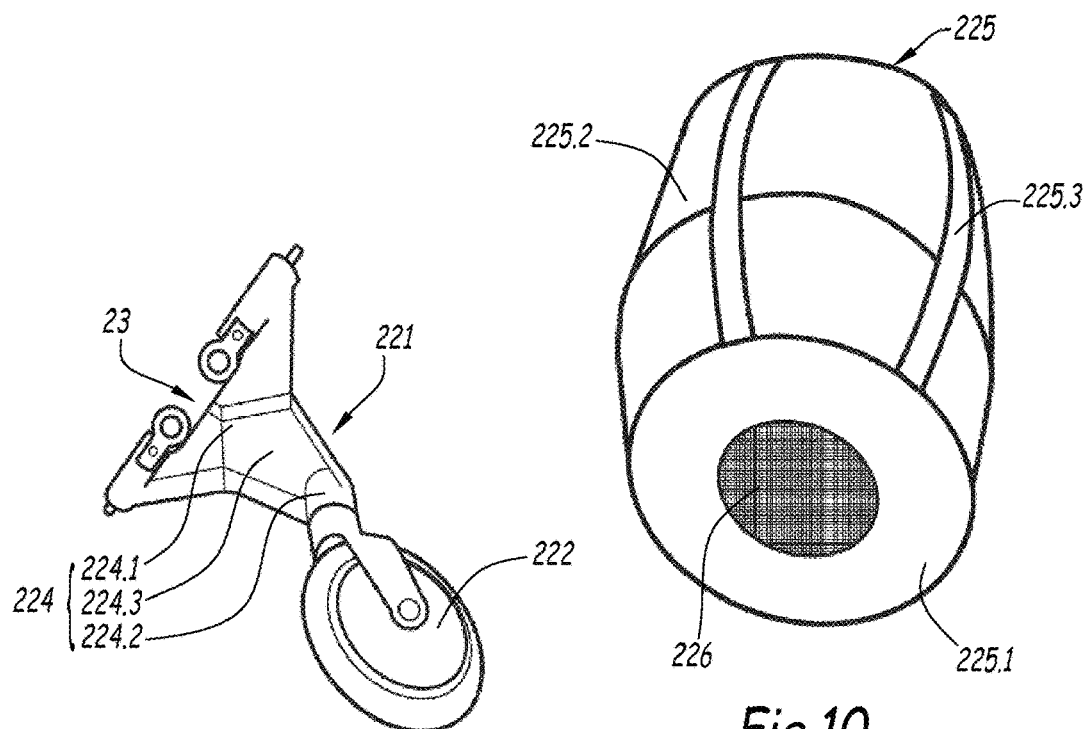
FIG. 10 is a perspective view showing, from an observation angle different from that of FIG. 9, only the accessory of FIG. 9.

More specifically, as shown in FIGS. 9 and 10, the accessory 220 includes a chassis 221 which, functionally similarly to the chassis 121 of the accessory 120, is provided with a single bearing wheel for rolling on the ground 222 that is omnidirectional. Furthermore, the chassis 221 bears the connection device 23 previously described, said device 23 allowing the reversible connection of the accessory 220 to the frame 11 of the pushchair 10, as illustrated by FIGS. 9 and 11 to 15. Furthermore, the accessory 220 includes a tote bag 225 allowing various objects and goods to be stored that the user wishes to convey jointly with the pushchair 10, causing this tote bag to be supported by the chassis 221. As previously explained for the tote bag 125, the tote bag 225 practically and effectively increases the merchandise transport capability for the transport assembly 201 compared to the pushchair 10 alone, while maintaining comfort, esthetics and safety.

The chassis 221 and the tote bag 225 of the accessory 220 are designed to be secured to one another reversibly and instantaneously. To that end, a bottom 225.1 of the tote bag 225 is equipped, in particular on its face facing the chassis 221 when the latter bears the tote bag, with a securing member 226, as clearly shown in FIG. 10, while a platform 224 of the chassis 221 is equipped, in particular on its face facing the tote bag when the chassis bears the tote bag, with a securing member 227, as clearly shown in FIG. 9: the members 226 and 227 make it possible to secure the tote bag 225 to the chassis 221 both reversibly, in that the cooperation of said members 226 and 227 prevents the untimely separation of the tote bag 225 from the chassis 221 during movements of the transport assembly 201, and separately, in that the user can separate the tote bag from the chassis as long as a stress is applied to the tote bag that is both strong enough and oriented in a predetermined direction, for example vertically upward, and instantaneously, in that the members 226 and 227 cooperate with one another when they are placed in contact with one another without it being necessary to activate their cooperation by a manipulation in addition to that consisting of placing the member 226 against the member 227, in particular that consisting of depositing, under the effect of gravity, the member 226 on the member 227. In practice, the members 226 and 227 are magnets and/or automatic clips and/or hook and loop systems of the VELCRO type (registered trademark) and/or etc.

In the extension of the foregoing considerations, the base of the tote bag 225 is advantageously provided to be circular and is dimensioned to wedge a front portion of the tote bag 225 between the uprights 16G and 16D of the pushchair 10.

In this way, the positioning of the tote bag when it is placed on the chassis 221 is made easier for the user, who can use the uprights of the frame of the pushchair to guide, by self-centering, the tote bag that the user deposits "on-the-fly".

Figure 11:
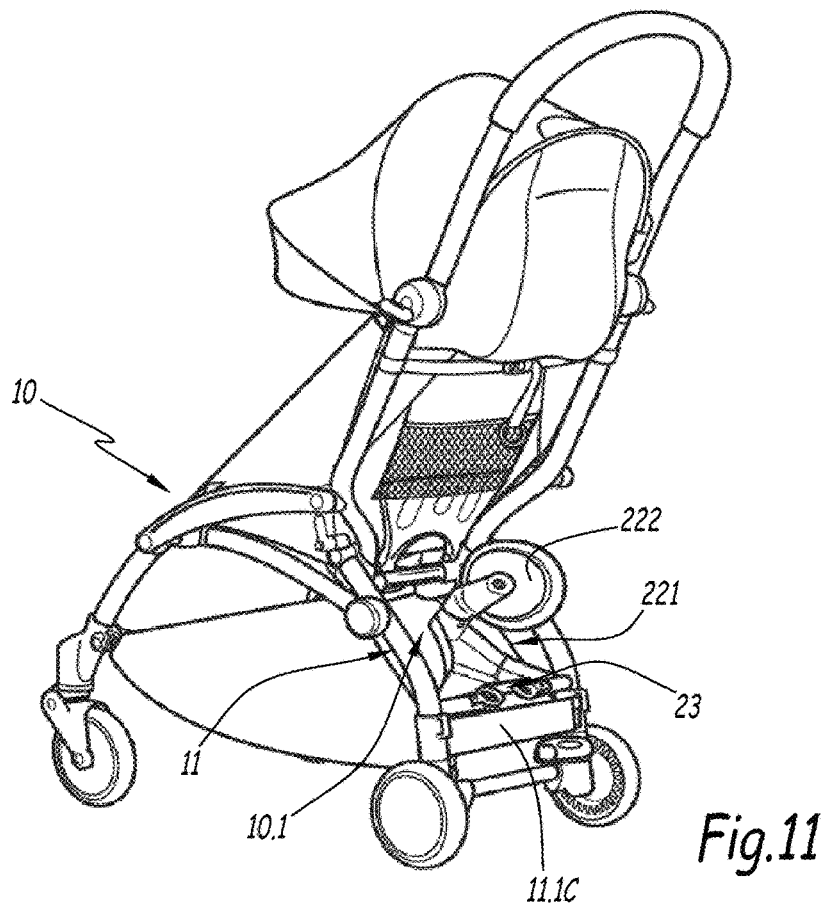
FIG. 11 is a perspective view illustrating a usage configuration, with the pushchair, of part of the accessory of FIG. 9.

According to similar considerations developed above for the chassis 121, the chassis 221 has a short total anteroposterior dimension. The chassis 221 thus does not bother the adult who pushes the pushchair 10 when the accessory 220, connected to the frame 11 of the pushchair, rolls on the ground behind the pushchair like in FIGS. 9 and 12 to 15. Furthermore, subject to the pivoting of the accessory 220 upward around the axis Y-Y while the device 23 maintains the connection between the chassis 221 and the pushchair 10, the chassis 221, in particular without the tote bag 225, can be folded toward the inside of the lower basket 10.1 of the pushchair 10, as illustrated by FIG. 11.

According to one advantageous embodiment aspect, the platform 224 has a slender shape that extends in the anteroposterior direction of the chassis 221, as clearly shown in FIGS. 9 and 10. The platform 224 having this slender shape includes:
- a front end 224.1 at which the connection device 23 is arranged, the translation axis Y-Y defined by said device 23 extending in particular perpendicular to the longitudinal direction of the platform 224;
- a rear end 224.2 at which the wheel 222 is arranged, more specifically at which the pivot axis is arranged, extending transversely to the platform 224, around which the omnidirectional wheel 222 can freely pivot to change orientation; and
- a running part 224.3, which connects the front 224.1 and rear 224.2 ends to each other and which bears the securing member 227.

The slender configuration of the platform 224 has many practical interests. Indeed, this substantially limits the risks of interference between the chassis 221 and the feet of the adult pushing the pushchair 10 during the walking of said adult. Furthermore, the wheel 221 can pivot over 360° around its pivot axis without risk of interference with the rear wheel train 13 of the pushchair 10. Additionally, the load produced by the tote bag 225 is distributed effectively, and therefore thus stabilized, between the uprights 16G and 16D of the frame 11 of the pushchair, via the connection device 23, and the wheel 222. Furthermore, a child is discouraged from climbing on the chassis 221 without the presence of the tote bag 225, since said child cannot easily stand on the narrow platform 224.

Figure 12:
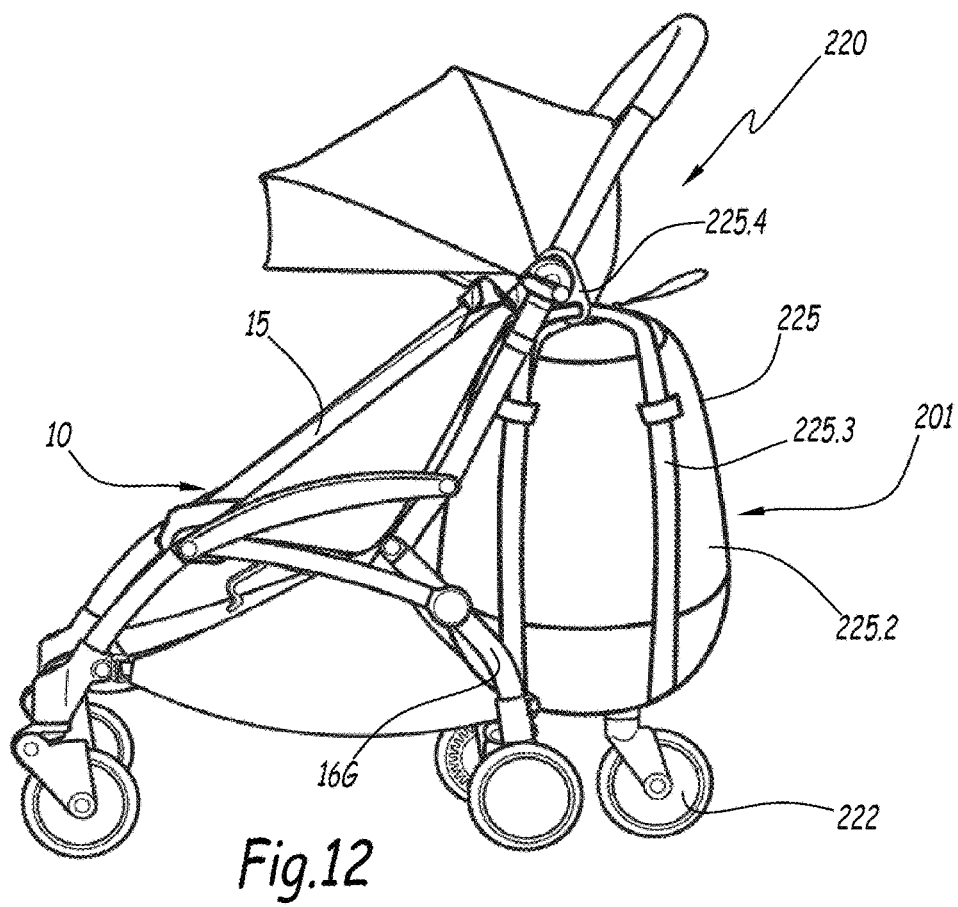
FIGS. 12 to 15 are perspective views of the accessory of FIG. 9, used with the pushchair of FIG. 1, in respective usage configurations that are different from one another.
Figure 13:
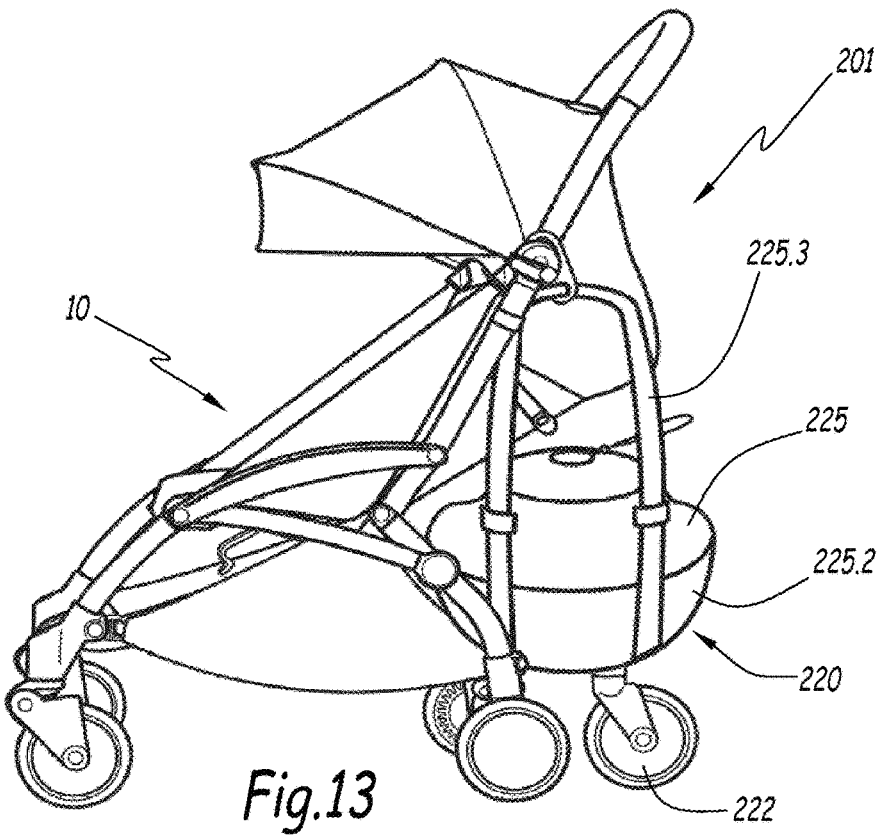
Figure 14:
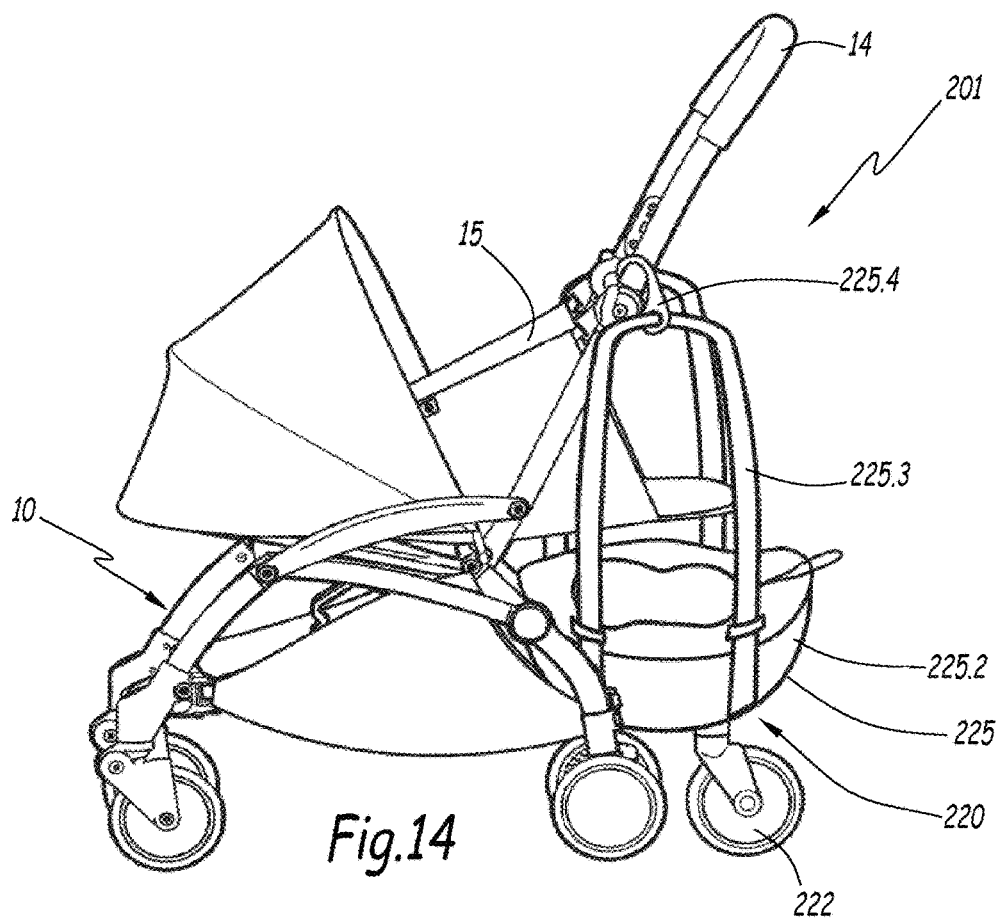
Figure 15:
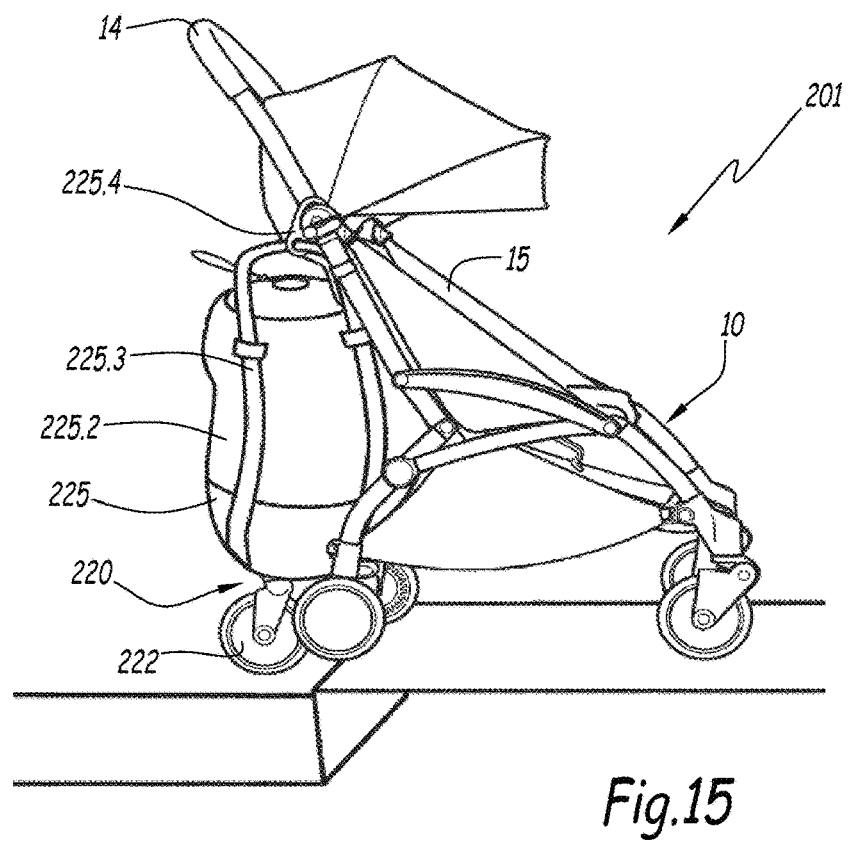

According to one particularly advantageous optional arrangement, the tote bag 225 includes, in addition to a main body 225.2 that is provided to be flexible and can thus deform to form a storage pouch of adjustable volume, arrangements making it possible to connect, directly and removably, the main body 225.2 of the tote bag 225 and the frame 11 of the pushchair 10. In the example embodiment considered in the figures, these developments include, as clearly shown in FIG. 9, straps 225.3, respectively left and right, which extend respectively on the left flank and the right flank of the main body 225.2 and which, at their apex advantageously forming a carrying handle of the tote bag, respectively cooperate with hooks 225.4, respectively left and right, connected to parts, respectively left and right, of the frame 11 of the pushchair 10, as shown in FIGS. 12 to 15. In practice, the left and right hooks 225.4 are either borne permanently by the straps 225.3 while being removable, by hooking, from the frame 11, or are borne permanently by the frame 11, for example by clipping, while being removable, by hooking, from the straps 225.3, or removable both from the frame 11 and the straps 225.3. Of course, embodiments other than those in the figures can be considered for these developments. In all cases, the interests of such developments are numerous and remarkable. Indeed, the direct and removable link guaranteed by these developments between the main body 225.2 of the tote bag 225 and the frame 11 of the pushchair 10 keeps the tote bag in shape when the latter is empty or not very filled so as to prevent the tote bag from collapsing on itself due to the flexibility of its main body 225.2, as shown in FIGS. 12 and 13. Such maintenance in shape of the tote bag 225 is particularly advantageous when its main body 225.2 is arranged below a cradle, as receiving member 15, overhanging toward the rear above the chassis 221, as illustrated by FIG. 14. The connection provided by the aforementioned developments also substantially reinforces the stability of the tote bag 225 within the transport assembly 201, in particular when the latter crosses an obstacle, such as a step, as illustrated by FIG. 15. In other words, the aforementioned developments, such as the straps 225.3 and the hooks 225.4 in the example considered in the figures, reinforce the securing between the tote bag 225 and the chassis 221 guaranteed by the members 226 and 227, while limiting the downward pivoting, around the axis Y-Y relative to the pushchair 10, of the accessory 220 when the wheel 222 is no longer pressed on the ground due to a bearing level difference relative to the pushchair 10 like in FIG. 15. Regarding this last aspect, it will be noted that the retention of the accessory 220 in downward pivoting when the wheel 222 is located above a level change of the ground can be guaranteed, in addition to or as a replacement for the removable link and directly between the tote bag 225 and the frame 11 of the pushchair, by the direct downward bearing of the platform 224 of the chassis 221 against a stop 11.1C secured to the frame 11 of the pushchair and arranged between the rear parts 11.1G and 11.1D, in particular connecting the uprights 16G and 16D to one another as considered in FIG. 9.

The transport assemblies 101 and 201 illustrate the multiplicity of embodiments that an accessory may assume, such as the accessories 20, 120 and 220, able to be connected reversibly to the frame 11 of the pushchair 10, this connection being done by the device 23 by means of which said accessory, once connected to the pushchair, can be pulled by said pushchair when the latter is pushed.

The invention claimed is:
1. A pushchair accessory, including:
  a chassis provided with at least one bearing wheel for rolling on the ground, and
  a device for reversibly connecting to the frame of a pushchair, said device being borne by the chassis and being suitable for being attached between a left upright and a right upright of the pushchair, which respectively belong to a left rear part and a right rear part of the frame of the pushchair, which are parallel to one another and which have respective faces, opposite one another, in which a first female housing and a second female housing are respectively hollowed, the device including:
  a first male element that is movable relative to the chassis between a connection position, in which the first male element is received in a complementary manner in the first female housing when the device is attached between the left and right uprights of the pushchair, and a disconnection position, in which the first male element is outside the first housing, a second male element that is movable relative to the chassis between a connection position, in which the second male element is received in a complementary manner in the second female housing when the device is attached between the left and right uprights of the pushchair, and a disconnection position, in which the second male element is outside the second housing, and a mechanism for actuating the first and second male elements, said mechanism being suitable for:
by stress from a single hand of a user, jointly driving the first and second male elements from their connection position to their disconnection position, and
in the absence of stress, automatically returning the first and second male elements from their disconnection position to their connection position.

2. The pushchair accessory according to claim 1, wherein the mechanism includes, for each of the first and second male elements:
a drive member, which drives the corresponding male element manually from its connection position to its disconnection position and which is provided with a gripping relief, the gripping reliefs respectively associated with the first and second male elements being configured to be stressed respectively by two fingers of a same hand of the user to jointly drive the first and second male elements, and
a return spring, which is mechanically inserted between the corresponding drive member and the chassis and which resiliently returns the corresponding male element from its disconnection position to its connection position.

3. The pushchair accessory according to claim 1, wherein the first and second male elements are translatable along a same axis between their connection position and their disconnection position, and wherein the first and second male elements translate from their connection position to their disconnection position, coming closer to one another along the axis.

4. The pushchair accessory according to claim 2, wherein the first and second male elements are translatable along a same axis between their connection position and their disconnection position, wherein the first and second male elements translate from their connection position to their disconnection position, coming closer to one another along the axis, and wherein the drive members respectively associated with the first and second male elements are translatable along the axis and have their gripping reliefs come closer to one another along said axis when they are stressed manually to jointly drive the first and second male elements from their connection position to their disconnection position.

5. The pushchair accessory according to claim 1, wherein the device further includes a support that supports and guides the movement of the mechanism and the first and second male elements, this support being fixedly connected to the chassis either permanently or removably.

6. The pushchair accessory according to claim 4, wherein the device further includes a support that supports and guides the movement of the mechanism and the first and second male elements, this support being fixedly connected to the chassis either permanently or removably, and wherein the support comprises a sheath that extends along the axis and that includes:
a first end part:
outside which the first male element deploys axially in the connection position,
inside which the first male element retracts axially in the disconnection position,
which inwardly receives the drive member associated with the first male element, cooperating by shape complementarity with said drive member to guide it in translation along the axis, and
which houses the spring associated with the first male element, forming a bearing for said spring;
a second end part:
which is axially opposite the first end part,
outside which the second male element deploys axially in the connection position,
inside which the second male element retracts axially in the disconnection position,
which inwardly receives the drive member associated with the second male element, cooperating by shape complementarity with said drive member to guide it in translation along the axis, and
which houses the spring associated with the second male element, forming a bearing for said spring; and
a running part, which connects the first and second end parts to one another and which forms a joint access notch to the gripping reliefs.

7. A transport assembly, comprising:
a pushchair including a frame, which is provided with bearing wheels for rolling on the ground and which includes a left rear part, comprising a left upright, and a right rear part, comprising a right upright that is parallel to the left upright, a first female housing and a second female housing respectively being hollowed in the face of the left upright and in the face of the right upright, which are opposite one another; and
a pushchair accessory, which is according to claim 1 and the first and second male elements of which in the connection position are respectively received in the first and second female housings to connect the accessory to the frame of the pushchair when the device of the accessory is attached between the left and right uprights of the pushchair.

8. The transport assembly according to claim 7, wherein the uprights, respectively left and right, are respectively inwardly provided with an insert for connecting to a same rear wheel train of the frame, and wherein the first and second female housings are respectively delimited in the insert of the left upright and in the insert of the right upright.

9. The transport assembly according to claim 7, wherein the frame is provided with positioning surfaces of the accessory, which cooperate by shape complementarity with the device so as to position the first and second female housings on the trajectory of the first and second male elements when the device of the accessory is attached between the left and right uprights of the pushchair and the first and second male elements go from their disconnection position to their connection position.

10. The transport assembly according to claim 7, wherein the first and second male elements in the connection position in the first and second female housings jointly form a pivot link between the device of the accessory and the frame of the pushchair.

11. The transport assembly according to claim 10, wherein the pushchair incorporates a lower basket, hooked on the frame and placed below a receiving member suitable for receiving a child to be conveyed by the pushchair, and wherein the chassis of the accessory is configured so as, while remaining connected to the frame of the pushchair by the device, to be folded down inside the lower basket by pivoting around the pivot link relative to the frame of the pushchair.

12. The transport assembly according to claim 7, wherein the accessory includes a platform suitable for bearing a child standing up or sitting on said platform while the chassis is connected to the frame of the pushchair by the device and the wheel(s) of the chassis rest on the ground.

13. The transport assembly according to claim 7, wherein the accessory includes a tote bag, as well as reversible and instantaneous securing means, which are made up of at least a first securing member, supported by a bottom of the tote bag, and at least one second securing member, supported by a platform of the chassis and which are suitable for securing the tote bag to the chassis by reversible and instantaneous cooperation between the first and second securing members.

14. The transport assembly according to claim 13, wherein the platform of the chassis has a slender shape having:
- a first longitudinal end at which the device is arranged,
- a second longitudinal end, which is opposite the first longitudinal end, and
- a running part, which connects the first and second longitudinal ends to each other and which bears said at least one securing member; and and wherein the chassis is provided with a single bearing wheel for rolling on the ground, having a rotation axis that is provided freely pivoting relative to the platform around a pivot axis, which extends transversely to the platform and which is arranged at the second longitudinal end of the platform.

15. The transport assembly according to claim 13, wherein the tote bag includes a flexible main body, which is deformable to form a storage pouch of adjustable volume, and connecting elements suitable for removably connecting the main body of the tote bag directly with the frame of the pushchair.

* * * * *